(12) United States Patent
Dolenti et al.

(10) Patent No.: US 9,939,076 B2
(45) Date of Patent: Apr. 10, 2018

(54) CONTROL SYSTEMS FOR VALVE ACTUATORS, VALVE ACTUATORS AND RELATED METHODS

(71) Applicant: Flowserve Management Company, Irving, TX (US)

(72) Inventors: William T. Dolenti, Lynchburg, VA (US); Earnest Carey, Evington, VA (US)

(73) Assignee: Flowserve Management Company, Irving, TX (US)

( * ) Notice: Subject to any disclaimer, the term of this patent is extended or adjusted under 35 U.S.C. 154(b) by 50 days.

(21) Appl. No.: 14/646,006

(22) PCT Filed: Nov. 19, 2012

(86) PCT No.: PCT/US2012/065833
§ 371 (c)(1),
(2) Date: May 19, 2015

(87) PCT Pub. No.: WO2014/077849
PCT Pub. Date: May 22, 2014

(65) Prior Publication Data
US 2015/0337983 A1    Nov. 26, 2015

(51) Int. Cl.
*F16K 31/02* (2006.01)
*F16K 31/00* (2006.01)
*F16K 37/00* (2006.01)

(52) U.S. Cl.
CPC .............. *F16K 31/00* (2013.01); *F16K 31/02* (2013.01); *F16K 37/0025* (2013.01); *Y10T 137/1842* (2015.04)

(58) Field of Classification Search
CPC ...... F16K 31/02; F16K 31/055; F16K 31/025; F16K 31/04; F16K 31/046; F16K 31/06;
(Continued)

(56) References Cited

U.S. PATENT DOCUMENTS 5,217,037 A    6/1993    Bristol
5,588,636 A    12/1996   Eichholz et al.
(Continued)

FOREIGN PATENT DOCUMENTS

CN    101900464 A    12/2010
CN    102464699 A    5/2012
(Continued)

OTHER PUBLICATIONS

"Limitorque MX: The Next Generation in Smart Actuation," 2006, 20 pages, FCD LMENBR2302-00, Flowserve Corporatiom, Irving, USA.
(Continued)

*Primary Examiner* — Matthew W Jellett
(74) *Attorney, Agent, or Firm* — Magleby, Cataxinos & Greenwood, P.C.

(57) ABSTRACT

Valve actuators include a control system and at least one human-machine interface device. Human-machine interface devices include at least one wireless input device operable by a user and at least one sensor configured to sense a force applied to the at least one wireless input device by the user. Valve systems may include such valve actuators. Methods of operating a control system of a valve actuator include sensing a force applied to at least one wireless input device and wirelessly transmitting an electronic signal in response to the applied force.

19 Claims, 6 Drawing Sheets

(58) Field of Classification Search
CPC ........ F16K 31/045; E03C 1/055; E03C 1/057; F02M 2200/24
USPC ............. 251/129.01, 129.03, 129.04, 129.12
See application file for complete search history.

(56) References Cited

U.S. PATENT DOCUMENTS

| | | | | |
|---|---|---|---|---|
| 5,675,359 | A * | 10/1997 | Anderson | G05G 9/047 200/6 R |
| 5,767,840 | A * | 6/1998 | Selker | G05G 9/047 338/2 |
| 6,955,333 | B2 | 10/2005 | Patterson et al. | |
| 7,497,298 | B2 * | 3/2009 | Shearer | E02F 3/7663 180/333 |
| 7,784,490 | B1 | 8/2010 | Stewart et al. | |
| 7,954,508 | B2 | 6/2011 | Doyle et al. | |
| 8,096,523 | B2 * | 1/2012 | Dolenti | F16K 37/0083 251/129.01 |
| 8,118,276 | B2 | 2/2012 | Sanders et al. | |
| 8,534,568 | B2 * | 9/2013 | Gautschi | E03C 1/055 236/12.1 |
| 2002/0084984 | A1 * | 7/2002 | Beinor | G05G 9/047 345/161 |
| 2003/0159732 | A1 | 8/2003 | Sanders | |
| 2005/0067595 | A1 * | 3/2005 | Teti | E03B 7/08 251/129.12 |
| 2007/0246550 | A1 * | 10/2007 | Rodenbeck | E03C 1/057 236/12.11 |
| 2007/0296170 | A1 | 12/2007 | Field et al. | |
| 2008/0061256 | A1 | 3/2008 | Lewis et al. | |
| 2009/0256090 | A1 | 10/2009 | Affaticati et al. | |
| 2009/0256807 | A1 | 10/2009 | Nurmi | |
| 2009/0314358 | A1 | 12/2009 | Stimpson et al. | |
| 2011/0178531 | A1 | 7/2011 | Caputo et al. | |
| 2011/0253220 | A1 | 10/2011 | Sawaski et al. | |
| 2012/0080622 | A1 | 4/2012 | Dolenti et al. | |
| 2013/0001449 | A1 * | 1/2013 | Choi | B66C 13/56 251/129.03 |

FOREIGN PATENT DOCUMENTS

| | | |
|---|---|---|
| CN | 202280900 A | 6/2012 |
| WO | 0165120 A2 | 9/2001 |
| WO | 2006047018 A2 | 5/2006 |
| WO | 2008131544 A1 | 11/2008 |

OTHER PUBLICATIONS

International Search Report and Written Opinion for International Application No. PCT/US2012/065833, dated May 10, 2013, 10 pages.

First Office Action for Chinese Application No. 201280078144.8, dated Aug. 19, 2012, 21 pages.

International Preliminary Report on Patentability for International Application No. PCT/US2012/065833, dated May 28, 2015, 7 pages.

* cited by examiner

CONTROL SYSTEMS FOR VALVE ACTUATORS, VALVE ACTUATORS AND RELATED METHODS

CROSS-REFERENCE TO RELATED APPLICATION

This application is a national phase entry under 35 U.S.C. § 371 of International Patent Application PCT/US2012/065833, filed Nov. 19, 2012, designating the United States of America and published in English as International Patent Publication WO 2014/077849 A1 on May 22, 2014, the disclosure of which is hereby incorporated herein in its entirety by this reference.

TECHNICAL FIELD

The present disclosure relates generally to valve actuators, and more particularly, to control systems for valve actuators including a wireless human-machine interface.

BACKGROUND

Valve actuators are used to operate valves and are manufactured in numerous shapes, sizes, forms, and have a wide variety of utilities. Valve actuators may be manually driven, electrically driven, operated by fluid pressure in which the shaft is connected directly or indirectly to a fluid operated piston, or other hydraulic systems.

A control system, or at least a portion thereof, is often positioned on the exterior housing of a valve actuator for controlling flow through a valve to which the valve actuator is connected through a human-machine interface (HMI). Such control systems enable a user to control various functions and configurations of the valve actuator, run diagnostics on the valve actuator, and check the status of the valve actuator.

Generally, such control systems have control inputs, such as knobs, that are mechanically operated to interface with the control system of the valve actuator. In some instances, a non-contact control input, such as magnetic knobs, enables the use of external knobs while the control system is sealed inside the valve actuator. In such a configuration, rotation of one or more magnets within the magnetic knobs alters a magnetic field produced by the knobs. A sensor, such as a Hall effect sensor within the valve actuator, senses the changes in the magnetic field of the knobs and provides corresponding input signals to the control system. Such configurations may be particularly useful in environmental conditions where the exterior of the valve actuator is subjected to wet environments where fluid or other contaminants may access the internal components of the valve actuator through a direct mechanical connection, such as through the shaft of a potentiometer.

However, a non-contact mechanical connection such as magnetic knobs may still have limitations. For example, the distance between the magnets in the knobs and the Hall effect sensors within the valve actuator must be tightly controlled such that the sensor can detect movement of the knobs. If the distance grows too far, then the sensors will not detect the magnets in the knobs. Furthermore, such magnetic knobs are generally required to move through a well-defined arc in order for the rotation to be sensed. Accordingly, special care must be taken in design and in operation to ensure that no contaminating material, such as water and ice, will build up on the moveable surface that could inhibit knob motion through its full designed arc. Further still, the magnetic sensors that can detect motion only along the well-defined arc limit the functionality of the knobs.

Finally, to prevent the knobs from moving inadvertently due to vibration or other unintended physical inputs, the knob may be required to be fitted with robust springs and detents to reduce the chances of inadvertent movement of the knobs. However, such robust springs and detents require the user to exert relatively strong forces on the knobs to move them. Accordingly, such forcing of the knobs may result in a degree of discomfort after configuring one or more actuators that may each require a significant number of knob movements to complete a configuration of the valve actuator. Furthermore, the springs and detents in the knobs may fail, thereby allowing the knobs to move by gravity or vibration to some unexpected position, which in turn may place the actuator into some unexpected operating mode.

BRIEF SUMMARY

In some embodiments, the present disclosure includes a valve actuator including a control system for controlling flow through at least a portion of a valve and comprising at least one receiver and at least one human-machine interface device. The at least one human-machine interface device includes at least one wireless input device operable by a user and at least one sensor configured to sense a force applied to the at least one wireless input device by the user. The at least one receiver of the control system may be configured to detect the force sensed by the at least one sensor.

In additional embodiments, the present disclosure includes a method of operating a control system of a valve actuator. The method includes sensing a force applied to at least one wireless input device, wirelessly transmitting a signal in response to the applied force, receiving the signal with a detector of a control system of the valve actuator, and responding to the signal with the control system of the valve actuator.

In yet additional embodiments, the present disclosure includes a valve system including a valve and a valve actuator including a human-machine interface.

The features, advantages, and various aspects of the present disclosure will be apparent to those skilled in the art from a consideration of the following detailed description taken in combination with the accompanying drawings.

BRIEF DESCRIPTION OF THE DRAWINGS

While the specification concludes with claims particularly pointing out and distinctly claiming that which is regarded as the present disclosure, the advantages of this disclosure can be more readily ascertained from the following description of the disclosure when read in conjunction with the accompanying drawings.

DETAILED DESCRIPTION

The methods, devices, apparatus, and systems of the present disclosure may be utilized to operate a valve actuator. For example, the present disclosure may be used to wirelessly operate a control system of a valve actuator.

Figure 1:
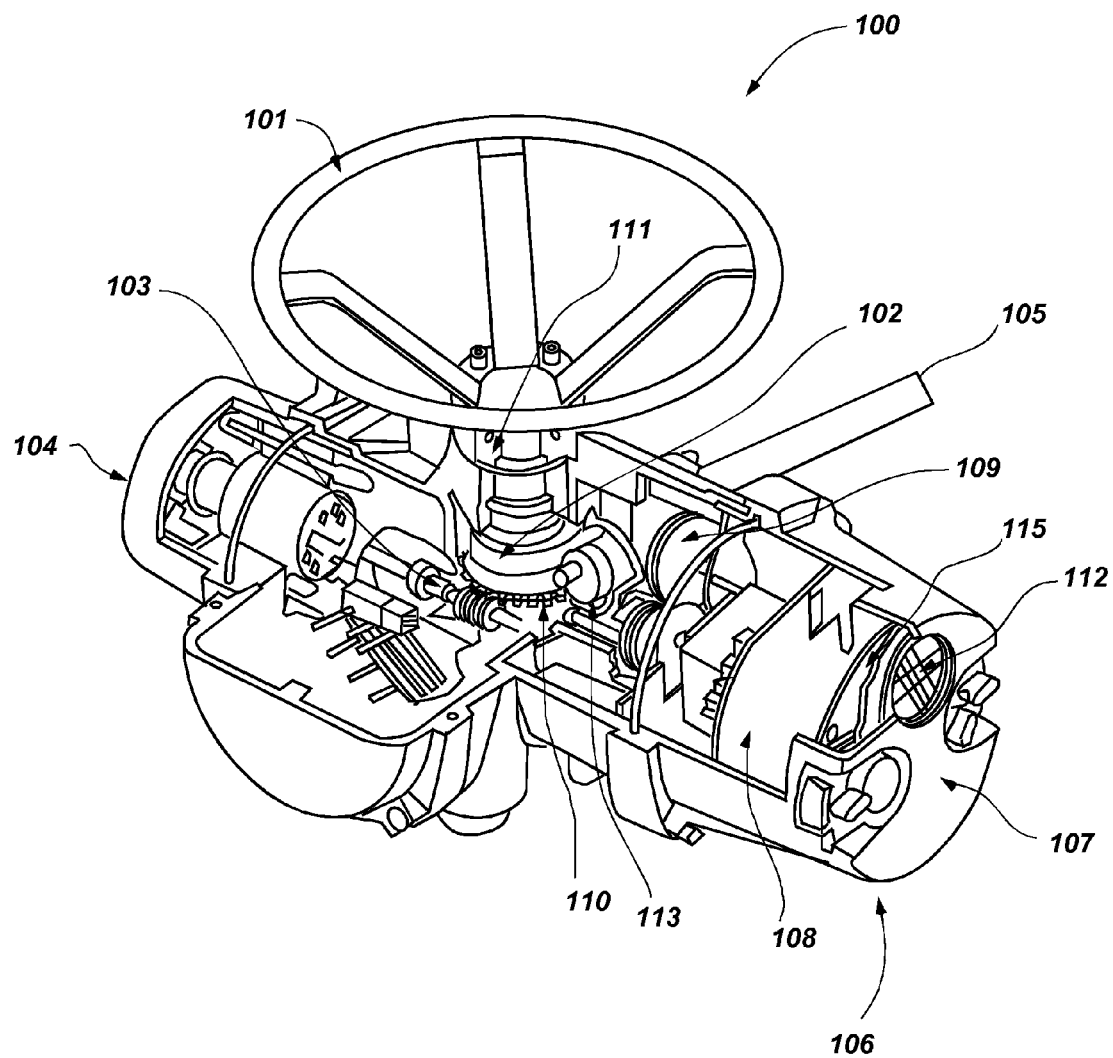
FIG. 1 is a cut-away view of an electrically driven valve actuator.

FIG. 1 illustrates an electrically driven valve actuator 100. FIG. 1 illustrates just one version of an electrically driven valve actuator and is not intended to limit the applicability of the disclosure to any electrically driven or other valve actuator (e.g., a pneumatic actuator, a hydraulic actuator, etc.). Valve actuator 100 includes electric motor 104 coupled to worm shaft 103. Handwheel 101 is connected to handwheel adapter 111. Handwheel adapter 111 is connected to drive sleeve 102. Drive sleeve 102 is connected to valve stem nut (not shown). Worm gear 110 mates with worm shaft 103. Worm gear 110 is also coupled to a valve stem nut, which is able to drive the valve stem of a valve. In FIG. 1, valve actuator 100 is not shown attached to a valve. Operation of either electric motor 104 or handwheel 101 raises or lowers a valve stem. The valve stem is able to travel up and down through the center of handwheel 101. The valve stem may also rotate and either operate a nut in the valve which can either open or close the valve or can directly rotate a valve to an open or close position (e.g., as in a butterfly, vane, or ball valve).

Valve actuator 100 may include any drive train, hardware, devices, electronics, and/or software utilized in operating a valve. Valve actuator 100 may be designed for any type of valve, including for example, linear, quarter-turn rotary, multi-turn rotary, ball, plug, gate, butterfly, and diaphragm valves. The components of valve actuator 100 may be arranged in any fashion. Handwheel 101 may be oriented to the side of valve actuator 100, as is known in the art.

The drive train encompasses any prime mover, any manual operation mechanism, any disengagement or isolation mechanisms, braking mechanisms, any speed modulation mechanisms, and the mechanisms for attachment to a valve. A drive train may also exclude any of the above elements or also include additional elements. For purposes of illustration only, FIG. 1 shows electric motor 104 as the prime mover and handwheel 101 as the manual operation mechanism. Often, a clutch mechanism will be included so that operation of either electric motor 104 or handwheel 101 does not result in operation of the other. By way of example, a lever 105 and a declutch mechanism 113 can be provided as the disengagement or isolation mechanisms. Numerous clutch and engagement mechanism are known in the art. Declutch mechanism 113 may be designed to engage or disengage any portion of the drive train of valve actuator 100.

In FIG. 1, the braking mechanism and speed modulation mechanisms are both incorporated in worm shaft 103 and worm gear 110. Instead of, or in addition to, worm gear 110 and worm shaft 103, other gear types or no gears may be used in valve actuator 100. Gear types for valve actuators are often selected based upon the amount of speed reduction, if any, between electric motor 104 and valve stem nut. Hereinafter, when referring to the gears of the drive train of a valve actuator, the example of a worm gear and a worm shaft are primarily utilized. However, it should be understood that the discussion may be applied to any gear. If a gear is not present in the valve actuator, then output mechanism of any applicable prime mover may also suffice.

In the example of FIG. 1, the mechanisms for attachment to a valve may be a valve stem nut and associated supporting structures, as are known in the art. However, any mechanism for attachment known in the art may be utilized. The term "valve" as used herein encompasses the most generic uses of the term as used in the art, including the definition of a device that at least partially controls the flow of a liquid, gas, and/or solid. Electric motor 104 may be any electrically driven prime mover capable of operating a valve actuator.

FIG. 1 also illustrates an exemplary control system 106 for the valve actuator 100. For example, the control system 106 may include a control module 108 for controlling electric motor 104, and depicts circuit board 115 for receiving inputs from human-machine interface (e.g., control panel 107) and for sending outputs to indicator 112. In this particular example, indicator 112 is illustrated as a liquid crystal display (LCD). One or more indicators 112 may be present. A few non-limiting examples of indicators include light-emitting diode lights (LED) and displays, filament lights, and dials. The control system 106 may also include an encoder 109, which is depicted as a multi-wheel absolute encoder in FIG. 1. In other embodiments, the encoder 109 may comprise a different type of encoder such as, for example, a single wheel absolute encoder, an incremental encoder, etc.

In some embodiments, the human-machine interface may be part of the control system 106. In other embodiments, the human-machine interface may be formed separate from and remotely communicate with the control system 106.

Figure 2:
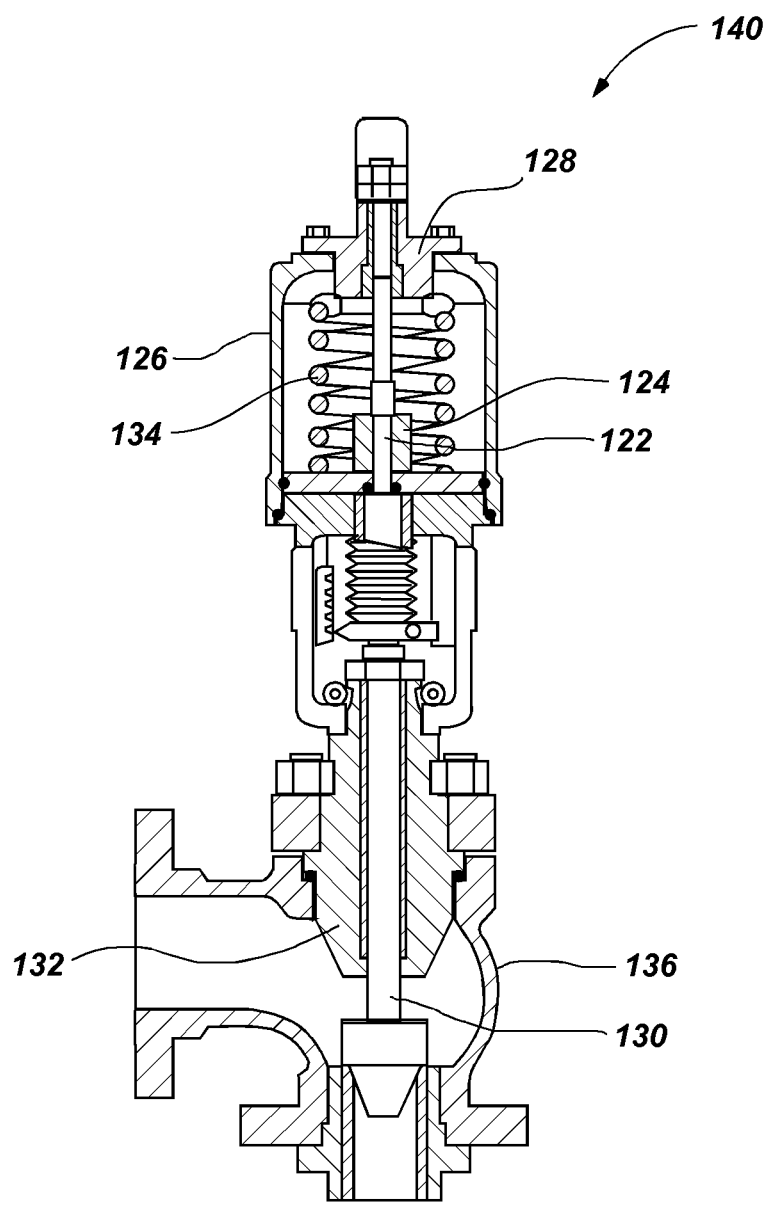
FIG. 2 is cross-sectional view of a pneumatically driven valve actuator.

The present disclosure is not limited to any particular valve actuator and may be applied to any valve actuator. FIG. 2 illustrates a pneumatically driven valve actuator, valve actuator 140, as known in the art. Valve actuator 140 is shown mated to valve 136 and actuator stem 122 is coupled to plug 130. The movement of actuator stem 122 results in corresponding movement of plug 130, which governs the operation of valve 136. Valve 136 may be a globe, gate, ball, butterfly, plug, diaphragm, or any other type of valve operable by an actuator. Actuator stem 122 and plug 130 are illustrated for a representative globe valve. However, it should be understood that either component may be modified depending upon the type of valve present. Additionally, when the phrase "drive train" is used hereinafter, the phrase encompasses the drive components of valve actuator 140, such as actuator stem 122.

Valve actuator 140 may also include a control system similar to the control system 106 as shown and described above with reference to FIG. 1.

Embodiments of the present disclosure include human-machine interfaces for use with control systems of valve actuators such as, for example, an internal control system or external (e.g., remote) control system of a valve actuator. Such a human-machine interface enables a user of the valve actuator to, for example, control various functions and configurations of the valve actuator, run diagnostics on the valve actuator, and check the status of the valve actuator. In particular, embodiments of human-machine interfaces in accordance with the present disclosure include human-machine interfaces that wirelessly and electronically communicate with the control system of a valve actuator. For example, the human-machine interface includes one or more input devices that are separated from (e.g., are not in direct electrical or mechanical connection with) the control system of the valve actuator. Such human-machine interfaces may enable a user to interface with the control system by sending electrical signals from the human-machine interface, while the control system is at least partially isolated from the human-machine interface (e.g., sealed within the valve actuator).

Figure 3:
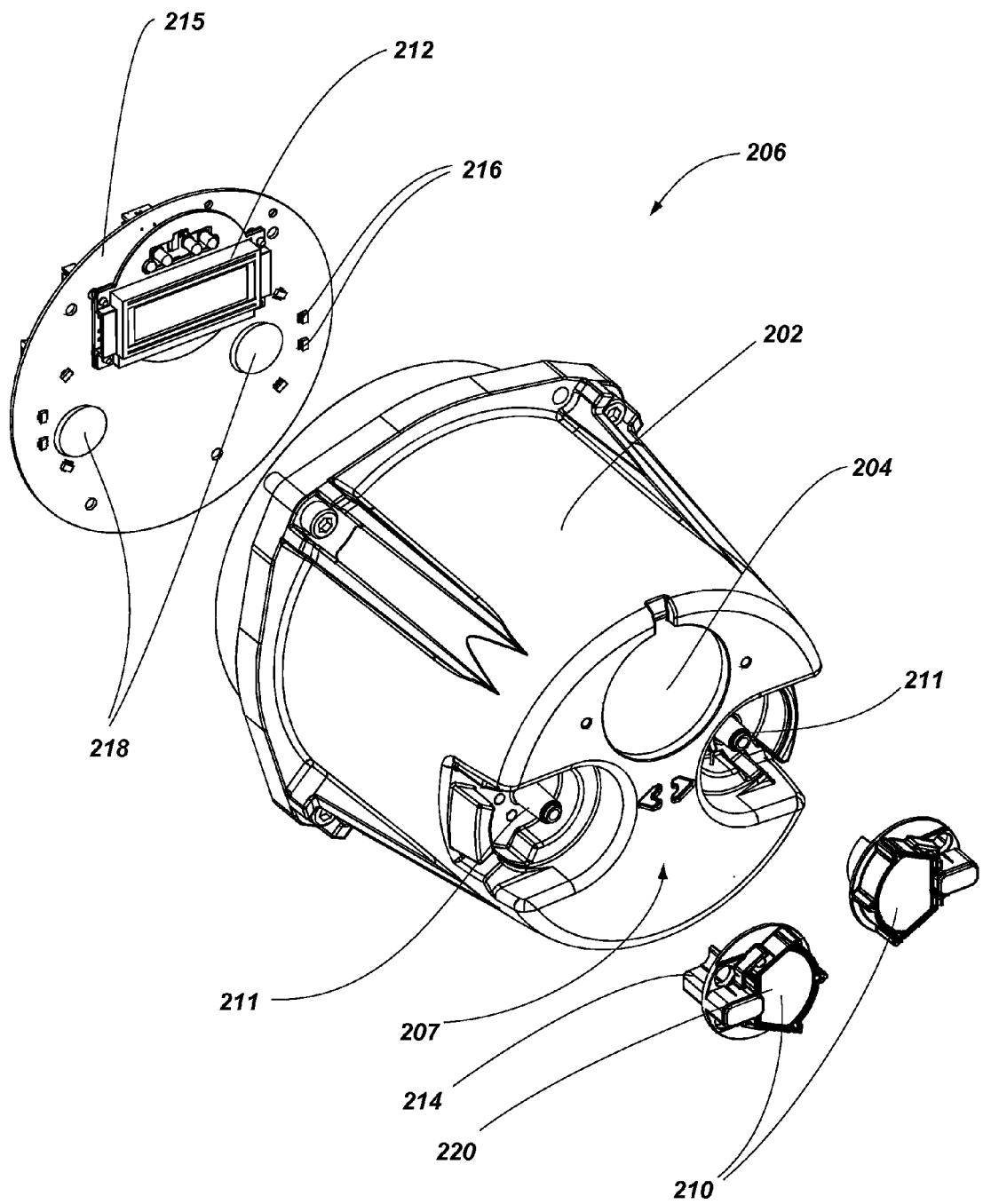
FIG. 3 is an exploded perspective view of a control system for a valve actuator in accordance with an embodiment of the present disclosure.

FIG. 3 is an exploded perspective view of a control system 206 for a valve actuator such as, for example, the valve actuators 100, 140 shown and described above with reference to FIGS. 1 and 2, respectively. As shown in the FIG. 3, control system 206 may be somewhat similar to control system 106 described above with reference to FIG. 1 and may include similar components and configurations. Control system 206 includes a housing 202. In some embodiments, the housing 202 may be a portion of the housing of the valve actuator (e.g., valve actuators 100, 140). In other embodiments, the control system may include a housing that is separate from the valve actuator (e.g., separate from the housing of the valve actuator). In some embodiments, the housing 202 may at least partially seal (e.g., hermetically seal) at least a portion of the control system 206 from a surrounding environment in which the control system 206 and/or valve actuator is placed.

Housing 202 may be formed to enable a user to operate the control system 206 of the valve actuator 100 (FIG. 1) by providing the user access to a human-machine interface (e.g., control panel 207) having one or more input and output devices for operation the control system 206 of the valve actuator 100 (FIG. 1). For example, housing 202 may include a transparent window 204 for viewing one or more indicators 212 of the control system 206 (e.g., indicators 212 sealed within the housing 202). As depicted, the indicator 212 may include a LCD screen and one or more LEDs that output signals from the control system 206 (e.g., to indicate a status of the valve actuator 100 (FIG. 1)). In other embodiments, the indicator 212 may be formed as part of the housing 202 and may communicate (e.g., through direct electrical connections or wirelessly) with the control system 206 in the housing 202.

The control panel 207 of the housing 202 further includes one or more input devices 210 accessible to a user. The input devices 210 are wireless to enable the remaining portion of the control system 206 to be removed from (e.g., sealed) the environment in which the input devices 210 are placed in order to be accessible to one or more users. For example, as depicted, the input devices 210 are not physically connected to at least a portion of the control system 206 by one or more wires or direct or indirect mechanical connections.

The control panel 207 of the housing 202 includes one or more supports 211 for coupling the input devices 210 to the exterior of the housing 202. The supports 211 may hold input devices 210 in a fixed position. For example, the supports 211 may restrict input devices 210 from moving in one or more directions (e.g., through translation and/or rotation). In such embodiments, a fixed input device 210 such as, for example, a knob or a joystick or trackball, as discussed below, may enable the input device 210 or components thereof (e.g., sensor or other electronic components within the input device 210) to be substantially less susceptible to contamination and/or damage from the environment (e.g., water, weather, chemicals, etc.) in which it is placed than a movable element with one or more movable components.

In other embodiments, the supports 211 may enable input devices 210 to displace or rotate a selected amount as discussed below.

Input devices 210 include one or more force sensors 214 for detecting one or more forces applied to the input devices 210 by a user. The force sensors 214, which are discussed in greater detail with reference to FIG. 4 below, may by formed on an exterior of the input devices 210, formed at least partially within the input devices 210, formed on an exterior of the supports 211 of the housing 202, formed at least partially within the housing 202 proximate the supports 211, or combinations thereof. One or more electronic signals are transmitted from the force sensors 214 (e.g., via electronic components of the input devices 210 as discussed below) in response to one or more forces applied to the input devices 210 by a user.

Referring still to FIG. 3, the control system 206 includes a portion (e.g., an internal portion within the housing 202) for receiving the signals transmitted from the force sensors 214. For example, control system 206 includes a circuit board 215 (e.g., a printed circuit board (PCB)) having electronics thereon for receiving signals from the force sensors 214 (e.g., one or more receivers 216 that, in some embodiments, may also include one or more transducers). The receivers 216 are in communication with the control system 208 of the valve actuator 100 (FIG. 1) and relay user input from the input devices 210 to the control system 208 to operate various functions of the valve actuator 100. Output (e.g., feedback) from the control system 208 of the valve actuator 100 in response to the user input may be relayed to the user through the indicators 212. s depicted, indicator 212 may also be connected and coupled to the circuit board 215.

In some embodiments, the control system 206 may include components for wirelessly powering the wireless input devices 210. For example, the circuit board 215 may include one or more wireless power devices 218 (e.g., magnetic or inductive charger). In some embodiments, the wireless power devices 218 may power one or more batteries of the input devices 210. The battery may be electrically connected to and utilized to power the force sensors 214 and/or other electronic components 220 (e.g., one or more transponders, one or more radio-frequency identification (RFID) chips, one or more transducers or other processors, one or more transmitters, or combinations thereof) of the input devices 210. In other embodiments, the wireless power devices 218 may directly power the various components (e.g., the force sensors 214 and/or other electronic components 220 listed above) of the input devices 210 with or without the use of batteries. As depicted, the wireless power devices 218 may by positioned on the circuit board 215 proximate to each of the respective input devices 210 to decrease the distance between each input device 210 and its corresponding wireless power device 218.

In some embodiments, the wireless power device 218 and receiver 216 may be formed as a transmitter-receiver device for transmitting a signal to the electronic components 220 of the input device 210 (e.g., a transponder) and receiving information back from the input device 210 in response to the transmitted signal.

Figure 4:
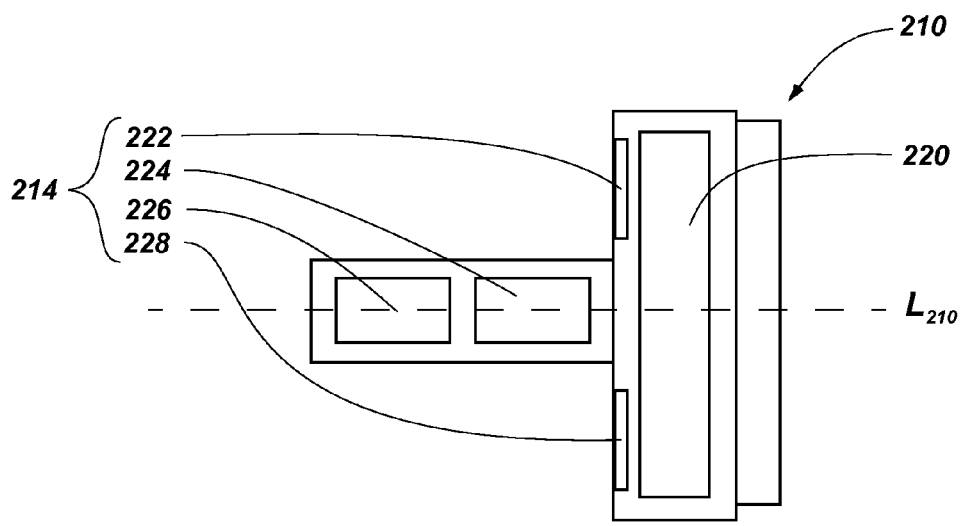
FIG. 4 is a schematic view of an input device of the control system of FIG. 3.

FIG. 4 is a schematic view of an input device (e.g., the input device 210 as shown and described with reference to FIG. 3) for use with the control system 206 also shown in FIG. 3. As shown in FIG. 4, the input device 210 may include force sensors 214 positioned on various portions of the input device 210 to detect various forces applied to the input device 210 by a user depending on the type of sensors implemented. For example, the input device 210 may include one or more sensors positioned along a longitudinal axis $L_{210}$ of the input device 210 (e.g., sensors 224, 226) and/or one or more sensors positioned in a direction transverse to the longitudinal axis $L_{210}$ of the input device 210

(e.g., sensors 222, 228). As discussed above, force sensors 214 may be positioned on or at least partially within the input device 210 or on a portion of the housing 202 (FIG. 3).

In some embodiments, force sensors 214 may include strain gauge load cell sensors (e.g., a stain gauge with an elastic element, an electrical resistance strain gauge, a foil stain gauge, a semiconductor stain gauge, a thin-film stain gauge, a wire stain gauge, or combinations thereof), capacitive sensors, piezoelectric force sensors (e.g., a multi-component piezoelectric force transducer), pressure sensors (e.g., hydraulic load cells, pneumatic load cells, or combinations thereof), or combinations thereof.

The force sensors 214 may be positioned on the input device 210 to sense forces in one or more directions (e.g., linear forces, such as lateral and axial forces, and rotational forces). For example, the force sensors 214 may detect one or more of: lateral forces applied to the input device 210 in a direction transverse (e.g., perpendicular) to the longitudinal axis $L_{210}$ of the input device 210; axial forces applied to the input device 210 in along the longitudinal axis $L_{210}$ of the input device 210; and rotational forces (e.g., a torque, a moment) applied to the input device 210 about the longitudinal axis $L_{210}$ of the input device 210, for example, in a clockwise or counterclockwise direction. Stated in another way, the input device 210 may detect forces applied along the X-axis, Y-axis, and Z-axis of the input device 210 (where the Z-axis corresponds to the longitudinal axis $L_{210}$), which may also include forces applied at an angle between the X-axis and Y-axis, and to rotational forces applied to the input device 210 about the Z-axis. Stated in yet another way, the input device 210 may detect lateral forces applied along a lateral plane extending in a direction perpendicular to the longitudinal axis $L_{210}$ of the input device 210, axial forces applied along an axial plane extending in a direction along the longitudinal axis $L_{210}$ of the input device 210, and rotational forces applied about the longitudinal axis $L_{210}$ of the input device 210.

As mentioned above, and in some embodiments, the supports 211 of the housing 202 (FIG. 3) may hold the input device 210 in a fixed, non-movable state. For example, the force sensors 214 may be selected to detect relative small deformation (e.g., elastic deformation) in the input device 210 resulting from the force applied to the input device 210 by a user. By way of further example, where stain gauges are implemented as one or more of the force sensors 214, the stain gauges may be positioned on the input device 210 in selected orientations (e.g., along the longitudinal axis $L_{210}$, at an angle to the longitudinal axis $L_{210}$ such as 45 degrees, 90 degrees, or combinations thereof) in order to enable the sensors 214 to detect the resultant deformation of the input device 210 due to the various directional forces discussed above that may be applied to the input device 210 by a user.

In other embodiments, the supports 211 of the housing 202 (FIG. 3) may allow at least some movement of the input device 210 in order to actuate one or more of the force sensors 214.

Referring still to FIG. 4, and as discussed above, the input device 210 may include electronic components 220 for processing and/or transmitting signals from the force sensors 214 to another portion of the control system 206. For example, the electronic components 220 may include one or more transducers for converting the signals from the force sensors 214, one or more processors for modifying the signals, and one or more transmitters (e.g., a transponder such as an RFID chip) for sending the signals from the input device 210 to a corresponding receiver 216 of the control system 206 as shown in FIG. 3. In some embodiments, the control system 206 may also include one or more transducers and/or processors to further modify the signal as may be required. In embodiments where the input device 210 is remotely powered by the control system 206 (FIG. 3), the electronic components 220 may include one or more inductive coils for receiving power from inductive coils of the control system 206.

Figure 5:
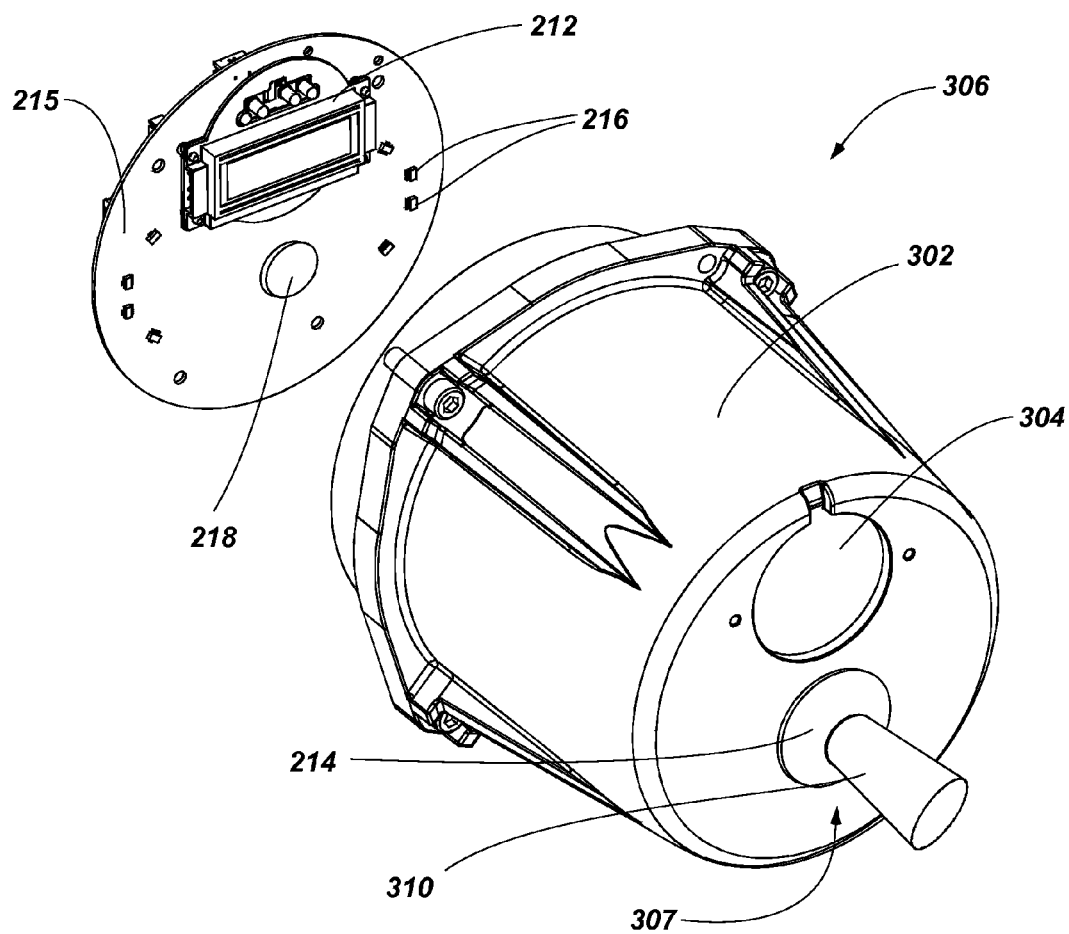
FIG. 5 is an exploded perspective view of a control system for a valve actuator in accordance with another embodiment of the present disclosure.

FIG. 5 is an exploded perspective view of another embodiment of a control system 306 for a valve actuator (e.g., valve actuators 100, 140). As shown in FIG. 5, the control system 306 may be similar to and include the various components of control systems 106, 206 discussed above with reference to FIGS. 1, 3, and 4. For example, control system 306 includes a circuit board 215, one or more receivers 216, an indicator 212, and a wireless power device 218. The control system 306 may also include a housing 302, which may be part of the housing of the valve actuator, having a transparent window 304 for viewing one or more indicators 212 of the control system 306.

Control system 306 may include a human-machine interface (e.g., control panel 307) having an input device 310 formed as joystick (e.g., a fixed, non-movable joystick). Similar to input device 210 (FIGS. 3 and 4) discussed above, input device includes one or more force sensors 214, which may include any of the various sensors listed above, to detect any the various forces applied by a user as detailed above. For example, the input device 310 may detect forces applied along the X-axis, Y-axis, and Z-axis of the input device 210 (where the Z-axis corresponds to a longitudinal axis of the joystick), which may also include forces applied at an angle between the X-axis and Y-axis, and to rotational forces applied to the input device 310 substantially about the Z-axis (e.g., clockwise or counterclockwise rotational force applied to the joystick).

Figure 6:
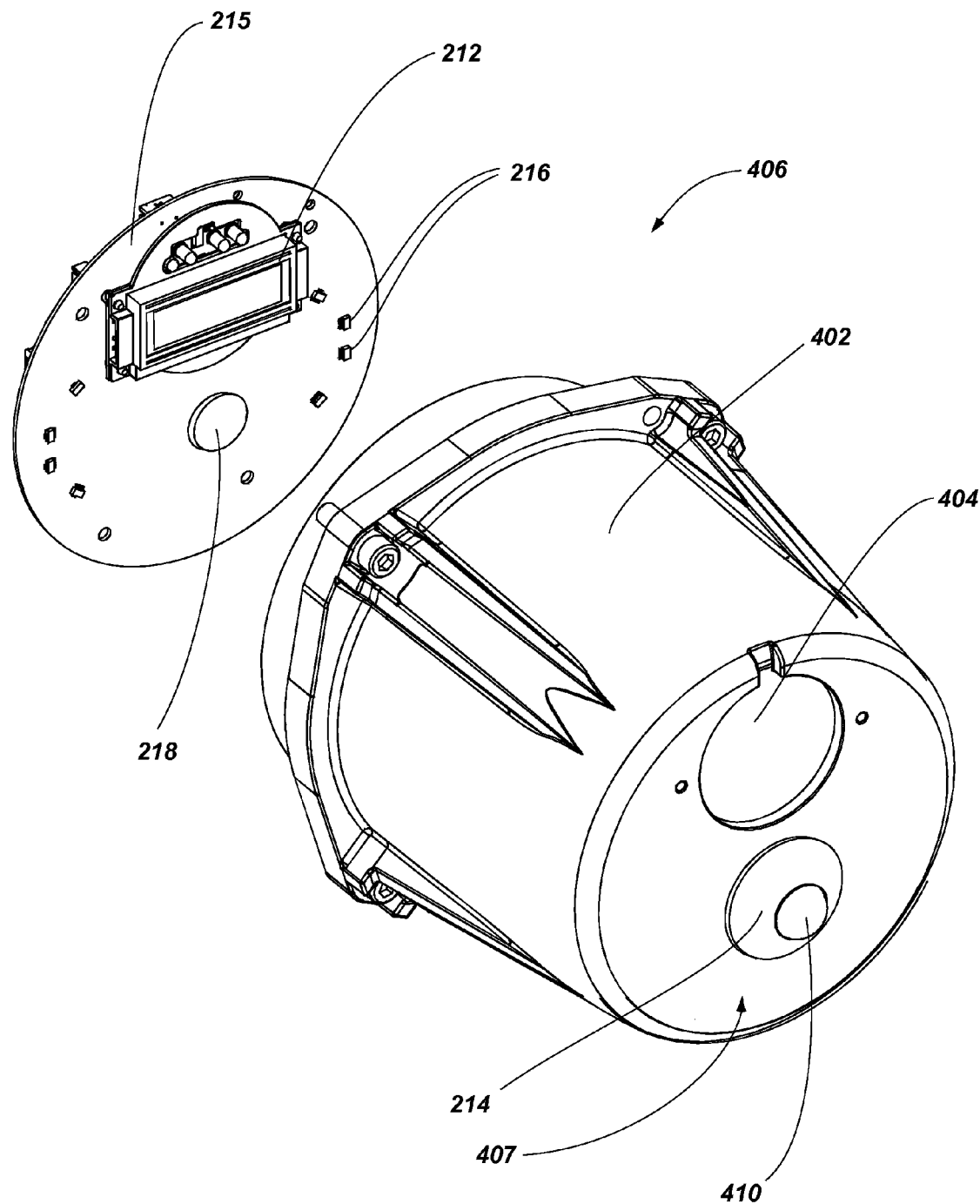
FIG. 6 is an exploded perspective view of a control system for a valve actuator in accordance with another embodiment of the present disclosure.

FIG. 6 is an exploded perspective view of yet another embodiment of a control system 406 for a valve actuator (e.g., valve actuators 100, 140). As shown in FIG. 5, the control system 406 may be similar to and include the various components of control systems 106, 206, 306 discussed above with reference to FIGS. 1 and 3 through 5. For example, control system 406 includes a circuit board 215, one or more receivers 216, an indicator 212, and a wireless power device 218. The control system 406 may also include a housing 402, which may be part of the housing of the valve actuator, having a transparent window 404 for viewing one or more indicators 212 of the control system 406.

Control system 406 may include a human-machine interface (e.g., control panel 407) having an input device 410 formed as a trackball (e.g., a fixed, non-movable trackball). Similar to input device 210 (FIGS. 3 and 4) discussed above, input device 410 includes one or more force sensors 214, which may include any of the various sensors listed above, to detect any the various forces applied by a user as detailed above. For example, the input device 410 may detect forces applied along the X-axis, Y-axis, and Z-axis of the input device 210 and forces applied at an angle between the X-axis and Y-axis, and to rotational forces applied to the input device 410 substantially about the Z-axis (e.g., clockwise or counterclockwise rotational force applied to the trackball).

In other embodiments, input device 410 may be formed as a tactile sensor that is sensitive to touch, force, and/or pressure (e.g., a multi-touch track pad or touch screen).

Figure 7:
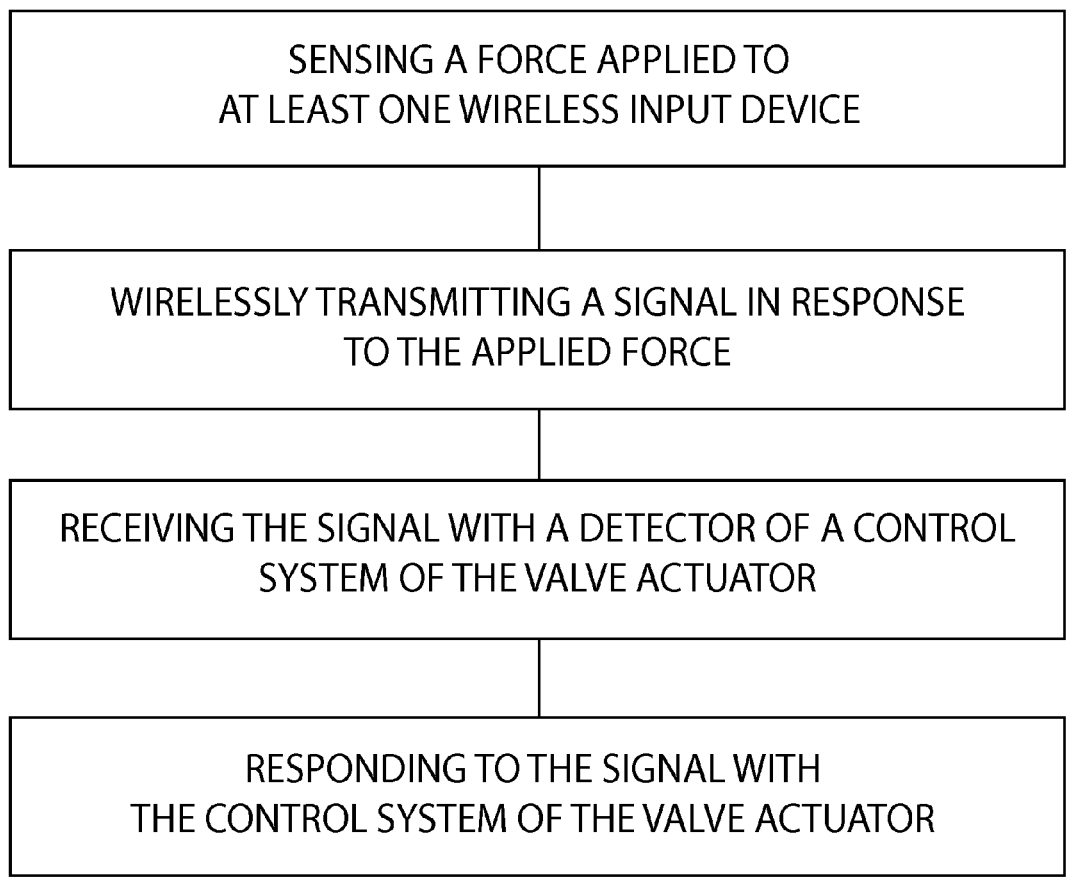
FIG. 7 is a chart illustrating a method of operating a control system of a valve actuator in accordance with an embodiment of the present disclosure.

FIG. 7 is a chart illustrating a method of operating a control system (e.g., control systems 106, 206, 306, 406) of a valve actuator (e.g., valve actuator 100, 140). As shown in FIG. 7, in an act, the control system senses a force applied to one or more wireless input devices. For example, a user may apply a linear or rotational force to the input device (e.g., a fixed input device positioned on the exterior of the valve actuator) that is detected by one or more sensors monitoring the input device.

In some embodiments, the control system may provide sufficient power to the input devices such that a force applied by a user may be sensed and transmitted back to the control system. For example, the control system may provide a constant amount of power to the input device such that the input device is capable of detecting a force without having to be readied beforehand.

In other embodiments, the input devices may include a power source in order to sense the force. For example, the input device may include a battery such that input device is capable of sensing a force without having to be readied (e.g., powered on or brought out of a sleep mode) before the force is inputted.

In yet other embodiments, another sensor may be used signal the control system to provide power to the input devices in order to sense the force. For example, the control system may include a feature enabling an action by the user to ready the control system before a force is applied to the input device (e.g., a button or switch separate from the input device, a proximity detector, etc.).

In another act, the control system wirelessly transmits a signal in response to the applied force. For example, the force sensor may relay the signal through one or more processors to a transmitter that transmits the signal to another portion of the control system (e.g., a portion sealed within the valve actuator). In embodiments where the input device includes a transponder (e.g., an RFID chip), the control system may transmit a signal to the input device, which may also provide power to the input device. In response to the signal, the transponder may relay back to the control system a signal indicating the force (e.g., a magnitude and direction of the force) detected by the force sensor. In some embodiments, the magnitude of the force detected by the sensor may be required to be greater than a preselected threshold valve. In such an embodiment, a portion of the control system (e.g., a portion of the control system within the valve actuator or the components of the input device) may compare the detected force magnitude to the threshold value to determine if the control system should respond to the applied force.

In yet another act, the control system receives the signal with a detector of the control system and responds to the signal. For example, the control system may receive and process the signal and respond with an output to an indicator (e.g., indicators 112 (FIGS. 3, 5, and 6)) by displaying, for example, a status of the valve actuator and/or a menu of the control system for operation of at least one of the control system and valve actuator.

As discussed above, the input devices may include sensors for detecting force in multiple directions. For example, the input devices may sense forces in multiple planes (e.g., a lateral plane and an axial plane) and rotational forces. In such embodiments, the input devices may enhance the user's ability to interface with and operate the control system of the valve actuator. For example, when one or more input devices configured as a fixed knob or joystick (e.g., input devices 210, 310 (FIGS. 3 and 5)) capable of detecting force in multiple directions are implemented; the user may utilize the fixed input devices to provide various commands to control system in order to operate the control system. By way of further example, the user may apply linear forces (e.g., in any direction along a lateral plane perpendicular to the longitudinal axis of the input devices) to navigate through menus or a graphical user interface (GUI) of the control system. The user may apply axial force (e.g., by pushing or pulling the input device along an axial plane) or apply a rotational force to select various portions of the menu or GUI. In some embodiments, the rotational forces applied to input devices may provide different functionality (e.g., a scrolling feature). In some embodiments, input device 410 as shown and described with reference to FIG. 6, may function in a similar manner.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims that follow.

What is claimed is:

1. A valve actuator comprising:
   a control system sealed within the valve actuator for controlling flow through at least a portion of a valve and comprising at least one receiver; and
   at least one human-machine interface device comprising:
     at least one wireless input device operable by a user; and
     at least one sensor configured to sense a force applied to the at least one wireless input device by the user, wherein the at least one sensor is chosen from the group comprising strain gauge load cells sensors, piezoelectric force sensors, hydraulic load cells, pneumatic load cells, or combinations thereof, wherein the at least one receiver of the control system is configured to electronically receive a force signal from the at least one sensor and require a magnitude of the force sensed by the at least one sensor to be greater than a threshold magnitude before responding to the force.

2. The valve actuator of claim 1, wherein the valve actuator comprises an electrically driven valve actuator.

3. The valve actuator of claim 1, wherein the at least one sensor is configured to sense at least one linear force and at least one rotational force.

4. The valve actuator of claim 3, wherein the at least one sensor is configured to sense:
   a lateral force applied along a lateral plane extending in a direction perpendicular to a longitudinal axis of the at least one wireless input device;
   an axial force applied along an axial plane extending in a direction along the longitudinal axis of the at least one wireless input device; and
   a rotational force applied about the longitudinal axis of the at least one wireless input device.

5. The valve actuator of claim 1, wherein the at least one wireless input device is wirelessly powered by the control system.

6. The valve actuator of claim 5, wherein the control system comprises an inductive charger for powering the at least one wireless input device.

7. The valve actuator of claim 1, wherein the at least one wireless input device is fixed in a stationary position.

8. The valve actuator claim 7, wherein the at least one wireless input device comprises at least one of a non-movable knob, a non-movable joystick, and a non-movable trackball.

9. A method of operating a control system of a valve actuator, the method comprising:
sensing a force applied to at least one wireless input device utilizing at least one sensor chosen from the group comprising strain gauge load cells sensors, piezoelectric force sensors, hydraulic load cells, pneumatic load cells, or combinations thereof;
wirelessly transmitting an electronic signal in response to the applied force;
receiving the signal with a detector operatively coupled to the control system of the valve actuator, wherein the control system is sealed within the valve actuator; and
responding to the signal with the control system of the valve actuator if the magnitude of the force sensed by the at least one sensor is greater than a threshold magnitude.

10. The method according to claim 9, further comprising wirelessly powering the at least one wireless input device with the control system.

11. The method according to claim 9, further comprising holding the at least one wireless input device stationary while the force is applied.

12. The method according to claim 9, wherein responding to the signal with the control system of the valve actuator comprises displaying a status of the valve actuator with at least one indicator.

13. The method according to claim 9, wherein responding to the signal with the control system of the valve actuator comprises displaying a menu of the control system to a user with at least one display.

14. The method according to claim 13, further comprising sensing at least one additional force applied to the at least one wireless input device in order to navigate the menu of the control system.

15. The method according to claim 9, wherein sensing a force applied to at least one wireless input device comprises:
sensing a lateral force applied along a lateral plane extending in a direction perpendicular to a longitudinal axis of the at least one wireless input device;
sensing an axial force applied along an axial plane extending in a direction along the longitudinal axis of the at least one wireless input device; and
sensing a rotational force applied about the longitudinal axis of the at least one wireless input device.

16. The method according to claim 15, wherein responding to the signal with the control system of the valve actuator comprises:
providing a first response to the lateral force;
providing a second response different than the first response to the axial force; and
providing a third response different than the first response and the second response to the rotational force.

17. The method according to claim 12, wherein sensing a force applied to at least one wireless input device comprises at least one of sensing a linear force, sensing an axial force, and sensing a rotational force.

18. A valve system comprising:
the valve actuator of claim 1 operably coupled to a valve.

19. The valve system of claim 18, wherein the valve comprises at least one of a multi-port valve, a rotary valve, a linear valve, a quarter-turn, and a single-turn valve actuator.

* * * * *